United States Patent Office 3,639,396
Patented Feb. 1, 1972

3,639,396
DERIVATIVES OF 7-AMINOCEPHALOSPORANIC ACID
Hans Bickel, Binningen, Rolf Bosshardt, Arlesheim, Bruno Fechtig, Binningen, Enrico Menard, Basel, Johannes Mueller, Arlesheim, and Heinrich Peter, Riehen, Switzerland, assignors to Ciba Corporation, New York, N.Y.
No Drawing. Filed June 25, 1968, Ser. No. 739,628
Claims priority, application Switzerland, July 5, 1967, 9,497/67; Oct. 27, 1967, 15,074/67
Int. Cl. C07d *99/24*
U.S. Cl. 260—243  3 Claims

ABSTRACT OF THE DISCLOSURE

Process for the manufacture of 7-acylamino-3-acyloxymethyl-3-cephem-4-carboxylic acids which contain in 3-position an acyloxymethyl group other than acetoxymethyl wherein an amino-protected O-desacetyl-cephalosporin C-dibenzhydrylester is acylated with an acid other than acetic acid, then the side chain in 7-position is eliminated, the benzhydrylester group split off and the 7-amino group acylated.

---

The present invention provides a new process for the manufacture of 7-acylaminocephalosporanic acids that contain in position 3 an acyloxymethyl group other than the acetoxymethyl group, and of their salts. The 7-acylamino-3-acyloxymethyl-3-cephem-4-carboxylic acids accessible by the present process correspond to the general formula

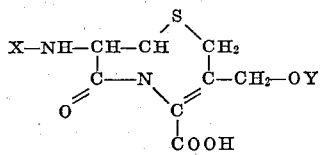

(I)
in which X and Y each represents an acyl group with the proviso that Y is not the acetyl group.

Certain compounds of the Formula I and processes for their manufacture are known. French Pat. 1,461,230 has disclosed a process for the manufacture of compounds of the general Formula I, wherein a suitable 7-acylamino-3-hydroxymethyl-3-cephem-4-carboxylic acid is converted into a 4-aralkyl ester thereof, then the hydroxymethyl group is acylated and finally the ester group eliminated. The elimination of benzyl ester groups by hydrogenolysis is particularly emphasised and illustrated by examples, furthermore, the elimination of bis(lower alkoxyphenyl)-methyl groups with glacial acetic acid is shown. The process gives only poor yields. Moreover, the 7-acylamino-3-hydroxymethyl-3-cephem-4-carboxylic acids used as starting material can be prepared only in a major number of stages by first converting cephalosporic C into the free 7-aminocephalosporanic acid (7–ACA), for example, by the process of Belgian Pat. 615,955, then acylating 7–ACA in position 7 and then eliminating the acetyl group of the side chain in position 3. The whole process is thus relatively complicated.

The present invention is based on the observation that it is advantageous to manufacture the compounds of the Formula I by esterifying an O-desacetyl-cephalosporin C-dibenzhydryl ester of the formula

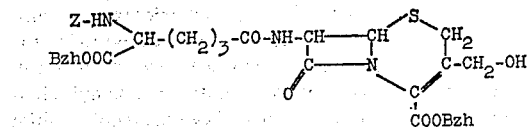

(II)
in which Bzh is a benzhydryl group, especially the unsubstituted benzhydryl group, and Z or Z—H stands for an amino protective group, by means of an acid Y—OH, then splitting off the side chain in position 7 by converting the amide group in the 7-position into an imide halide and imino ether group according to the process of French Pat. 1,394,820, and eliminating the benzydryl ester group by acid hydrolysis, preferably with trifluoracetic acid in the presence of anisole, and finally acylating the resulting compound of the formula

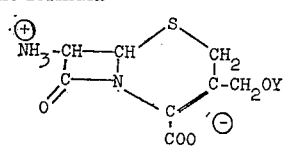

(III)
on the 7-amino group.

One advantage of this process over the process of French Pat. No. 1,461,230, is that both cephalosporin C and 7–ACA need not be isolated in pure form. Crude cephalosporin C as it results from the fermentation or a crude cephalosporin C protected on the amino group, for example trinitrophenyl-cephalosporin C (see patent application No. 17,309/66) can be used as starting materials as it is obtained. The end products are obtained in a better yield. The present process has the further advantage that it proceeds via the intermediate of the Formula III not acylated on the 7-amino group; in the last process stage this compound may be converted under mild conditions into any desired N-acyl derivative, especially also into a sensitive acyl derivative.

The present process is thus particularly suitable for manufacturing compounds of Formula I in which X stands for the cyanacetyl group and Y for the radical of any acid (as shown below), especially of an unsubstituted lower alkanoic acid with the exception of acetic acid or an alkanoic acid substituted by halogen atoms. Moreover, the process is particularly suitable for the preparation of compounds of Formula I in which Y represents the pivaloyl radical and X any acyl radical, as shown below, especially a phenylacetyl, phenoxyacetyl, S-phenylthioacetyl, thienyl-(2)-acetyl or cyanacetyl radical. The compounds of Formula I in which X is the cyanacetyl radical and Y another radical then that of acetic acid, or in which Y is the pivaloyl radical and Y any acyl radical, and the salts thereof, are new and are also the subject of the present invention. The intermediate products of Formula III in which Y represents the radical of an acid, particularly of an unsubstituted lower alkanoic acid or a lower alkanoic acid substituted by halogen atoms, are new and are also subject of the invention, as is the process for their manufacture.

The dibenzhydryl esters of the Formula II used as starting materials are accessible from amino-protected cephalosporin C by desacetylation, for example by means of an acetyl esterase according to the process described in British Pat. 1,080,904 for the manufacture of O-desacetyl-7–ACA, and esterification, for example with diphenyldiazomethane, as described in French Pat. 1,394,820.

In the compounds of the Formula II Z represents a protective group suitable for blocking the amino group, for example the groups mentioned in French Pat. 1,394,820. Amongst them the following may be specially mentioned: lower alkyl, aryl and acyl radicals, especially those which reduce the basicity of the amino group, such as phenyl or naphthyl residues which may be unsubstituted or be substituted, for example, by halogen atoms or by cyano, sulpho, carbamyl, carbalkoxy or above all nitro groups, for instance 2,4-dinitrophenyl, or 2,4,6-trinitrophenyl. Particularly suitable acyl radicals are lower alkanoyl radicals containing 1 to 6 carbon atoms, for example acetyl, propionyl, butyryl, also aroyl radicals such as benzoyl, and also benzoyl substituted by nitro, cyano or sulpho groups, halogen atoms, lower alkyl or lower alkoxy groups, and preferably N,N-phthaloyl. Furthermore, there may be used aryl-lower alkanoyl residues such as phenylacetyl, or the carbobenzoxy or tertiary butyloxycarbonyl residue, or the benzenesulphonyl or toluenesulphonyl residue for blocking the amino group.

The benzydryl group Bzh in the compounds of the Formula II is preferably unsubstituted; it may however be substituted in one or both of its phenyl nuclei, for example by one or several lower alkyl or lower alkoxy groups, trifluoromethyl or nitro groups or by halogen atoms.

The esterification of the hydroxymethyl group in position 3 of the compounds of the Formula II with acids of the Formula Y—OH is carried out in known manner. Thus, the compound may be reacted with the free acid in the presence of a condensing agent, for example carbonyldiimidazole, dicyclohexylcarbodiimide or a functional derivative of the acid, for example a halide, especially chloride, a pure or mixed anhydride, or with an activated ester of the acid. The esterification is advantageously performed at a low temperature, for example at —40 to 0° C.

Acids Y—OH suitable for the esterification are, for example, sulphonic acids such as lower alkyl- or arylsulphonic acids, for example methane- or ethanesulphonic acids, benzene- or toluenesulphonic acid; also especially carboxylic acids (with the exception of acetic acid) such as aliphatic, alicyclic, aromatic, araliphatic, heterocyclic or heterocyclyl-aliphatic carboxylic acids, for example lower alkane acids which may be substituted by halogen, such as formic, propionic, pivalic, diethylacetic, chloroacetic acid, cycloalkyl-lower alkane acids such as cyclohexylacetic acid; cycloalkane acids such as cyclopentane- or cyclohexane-carboxylic acid; aromatic and araliphatic carboxylic acids whose rings may be substituted, for example by lower alkyl or lower alkoxy groups, halogen atoms, nitro, carbamoyl or nitrile groups, for example benzoic, naphthoic, phenylacetic, phenylpropionic, cinnamic acid; carboxylic acids containing heterocyclic rings which rings may be substituted as mentioned above, for example pyridine-, furan- or thiophene-carboxylic acids, pyridyl-(2)-acetic or furyl-(2)-propionic acid.

The side chain in position 7 may be eliminated, for example, as described in French Pat. 1,394,820, by reaction with an imidehalide-forming agent, conversion of the imidehalide into an iminoether and hydrolysis of the iminoether. Imidehalide-forming agents are acid halides, especially acid chlorides, derived from phosphorus, sulphur, carbon or their oxyacids, for example phosphorus oxychloride, pentachloride or trichloride, thionylchloride, phosgene, oxalylchloride, pyrocatechol-phosphorus trichloride, above all phosphorus pentachloride. The reaction is preferably carried out in an inert organic solvent such as a hydrocarbon, for example benzene or toluene, or in a chlorinated hydrocarbon such as methylenechloride or chloroform, or in an ether such as dioxan, tetrahydrofuran or ethyleneglycol dimethyl ether or in a nitrile such as acetonitrile, preferably at a low temperature, for example at —20 to —10° C. The imidehalide is converted into an iminoether in the known manner by treatment with an alcohol, for example a lower alkanol, especially methanol, in the same reaction medium. The iminoether is hydrolyzed with water, preferably at a pH value of about 0 to 4, whereby a primary amino group is formed in position 7.

The benzhydryl ester group is eliminated as described in French Pat. 1,394,820 by acid hydrolysis, preferably with the aid of trifluoroacetic acid in anisole.

The acylation of the compounds of the Formula III is carried out by the methods known for the acylation of aminoacids, especially of 7–ACA, for example by the carbodiimide method, the azide method, the method of the mixed anhydrides or the method of the activated esters.

For the acylation the same acids may be used as have been mentioned above for the esterification of the 3-hydroxymethyl group, especially however acyl residues of known active 7-acylaminocephalosproanic acids, such as a residue of the formula $R_2(CH_2)_nCO$—in which $n$ is a whole number from 0 to 4 and preferably 1, and a $CH_2$ group may be substituted by an amino, cyano, free or esterified carboxyl or hydroxyl group or by a carbamyl group, and $R_2$ is an aryl, aryloxy, arylthio, cycloalkyl, cycloalkoxy, heterocyclyl, heterocyclyloxy or heterocyclylthio residue, which may be unsubstituted or substituted as described on page 5, for example 2,6-dimethoxybenzoyl, tetrahydronapthoyl, 2-methoxynapthoyl, 2-ethoxynaphthoyl, phenylacetyl, phenoxyacetyl, S-phenylthioacetyl, S-bromophenylthioacetyl, α-phenoxypropionyl, α-phenoxyphenylacetyl, α-methoxyphenylacetyl, α-methoxy-3,4-dichlorophenylacetyl, α-cyanophenylacetyl, benzyloxycarbonyl, S-benzylthioacetyl, S-benzylthiopropionyl, hexahydrobenzyloxycarbonyl, cyclopentanoyl, 2-thienylacetyl, α-cyano-2-thienylacetyl, 3-thienylacetyl, 2-furylacetyl, 2 - phenyl - 5 - methyl - isoxazolylcarbonyl, 2 - (2' - chlorophenyl) - 5 - methyl - isoxazolylcarbonyl or a residue of the formula

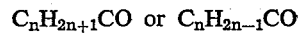

where $n$ is a whole number from 1 to 7, and the chain may be linear or branched or interrupted by an oxygen or a sulphur atom, or substituted by hydrogen, trifluoromethyl, cyano, amino, nitro, carboxyl, for example propionyl, butyryl, hexanoyl, octanoyl, butylthioacetyl, acrylyl, crotonyl, 2-pentenoyl, allylthioacetyl, chloroacetyl, β-bromopropionyl, aminoacetyl, α-carboxypropionyl, cyanoacetyl, α-cyano-β-dimethylacroyl, or a residue of the formula R—NH—CO— in which R represents an unsubstituted or substituted aromatic or araliphatic hydrocarbon residue, especially a lower alkyl residue substituted by lower alkoxy groups and/or halogen atoms.

The free acids may be converted into corresponding salts in known manner. The salts are either metal salts, above all those of therapeutically acceptable alkali or alkaline earth metals such as sodium, potassium or calcium, or salts with organic bases, for examples with triethylamine, N - ethyl - piperidine, dibenzylethylenediamine or procain.

The final products of the Formula I and their salts display good antibacterial activity. They act both against Gram-positive and Gram-negative bacteria, for example against penicillin resistant *Staphylococcus aureus*, *Eecherichia coli*, *Klebsiella pneumoniae* and *Salmonella typhosa*, as can be shown in animal tests, for example on mice. They may therefore be used to combat infections caused by such microorganisms, also as additives to animal fodder, for preserving foodstuffs or as disinfectants. Special mention deserve the above mentioned new compounds of the FormulaI in which X stands for cyanoacetyl and Y for acyl other than acetyl or Y stands for pivaloyl and X for acyl. Thus, for example, a single subcutaneous infection of 1.0 mg./kg. or a dosis of 3 mg./kg. p.o. of 3 - pivaloyloxymethyl - 7 - [thienyl - 2'-acetylamino] - ceph - 3 - em - 4 - carboxylic acid in the mouse infected with Staph. aureus has a pronounced chemotherapeutic activity.

The new acids and their salts may be used as medicaments, for example in the form of pharmaceutical preparations containing the compounds in conjunction or admixture with an organic or inorganic, solid or liquid pharmaceutical excipient suitable for enteral, local or parenteral administration. Suitable excipients are substances that do not react with the new compounds, for example water, gelatin, lactose, starches, stearyl alcohol, magnesium stearate, talcum, vegetable oils, benyl alcohols, gums, propyleneglycol, polyalkyleneglycols, white petroleum jelly or cholesterol, or other known medicinal excipients. The pharmaceutical preparations may be, for example, tablets, dragees, ointments, creams or capsules, or in liquid form solutions, suspensions or emulsions. They may be sterilized and/or may contain assistants such as preserving, stabilizing, wetting or emulsifying agents, solution promoters, salts for regulating the osmotic pressure or buffers. They may also contain further therapeutically valuable substances. The preparations are formulated by known methods.

The following example illustrates the invention without restricting its scope.

EXAMPLE 1

(1) While cooling with carbon dioxide snow, a solution of 3.34 g. (4 mmols) of 7 - [5' - phthalimido - 5'-carboxybenzhydryl - valeroyl] - amino - ceph - 3 - em - 3 - hydroxymethyl - 4 - carboxylic acid benzydryl ester in 7 ml. of dimethylformamide is dropped into a mixture of 3.46 ml. (40 mmols) of propionylchloride and 2.90 ml. (36 mmols) of pyridine in 30 ml. of absolute dimethylformamide. The batch is allowed to react for 3 hours at room temperature. The reaction product is distributed between 800 ml. of monobasic potassium phosphate solution of 10% strength and 1 litre of ethyl acetate and each is once more extracted with ½ litre of ethyl acetate. The combined ethyl acetate extracts are washed with saturated sodium chloride solution, dried with sodium sulphate and evaporated, to yield 7 - [5' - phthalimido-5' - carboxybenzhydrylvaleroyl] - amino - ceph - 3 - em - 3 - propionyloxymethyl - 4 - carboxylic acid benxydryl ester which crystallizes in the form of colourless clusters from acetone+ethyl acetate and melts at 163–165° C. $[\alpha]_D^{20} = +16°$ (c.=1.119 in chloroform). Ultraviolet absorption spectrum in rectified alcohol: $\lambda_{max}$ 260 m$\mu$ ($\epsilon$=9100), $\lambda_{infl.}$ 241 m$\mu$ ($\epsilon$=14,300). In the thin-layer chromatogram on silicagel in the system toluene-acetone 9:1 the substance reveals an $R_f$ value of 0.19.

The starting material may be prepared thus:

A suspension of 20.0 g. (36.7 mmols) of N,N-phthaloyl-cephalosporin C (of 72% purity) in 400 ml. of distilled water is turned into a solution with 71 ml. of N-sodium hydroxide solution. The solution is stirred for 20 hours with 400 mg. of the acetyl esterase of *Bacillus subtilis* ATCC 6633 at 37° C. while keeping the pH value constant at 7.3. The acetic acid liberated by the enzymatic hydrolysis is neutralized with 32 ml. of N-sodium hydroxide solution. On completion of the hydrolysis reaction ethyl acetate and, while cooling at 0° C. and stirring, 20% phosphoric acid are added until a pH value of 2.3 has been reached. The aqueous phase is saturated with sodium chloride and further extracted with 3× 300 ml. of ethyl acetate. The extracts are washed with saturated sodium chloride solution, dried with sodium sulphate and evaporated. The desacetylated crude product of N,N-phthaloyl-cephalosporin C is taken up in 320 ml. of dioxan and 80 ml. of methanol, then 18 g. of diphenyldiazomethane are added portionwise and the whole is stirred for 3 hours at room temperature. The solution is then evaporated to dryness and the residue digested with 2× 400 ml. of ether. The residue is dissolved in benzene and chromatographed on 200 g. of silicagel washed with acid (diameter of column 4.15 cm.) Fractions of 100 ml. each are withdrawn. Three fractions each obtained with benzene, benzene+ethyl acetate 9:1 and benzene+ethyl acetate 5:5, are discarded. The next four benzene+ethyl acetate 5:5 fractions elute 7-[5'-phthalimido - 5' - carboxybenzhydryl-valeroyl]-amino-ceph - 3 - em - 3 - hydroxymethyl-4-carboxylic acid benzhydryl ester and this product is crystallized from ethyl acetate+cyclohexane. It melts at 113–115° C. $[\alpha]_D^{20} = +5° \pm 1°$ (c.=1.131 in chloroform). Ultraviolet absorption spectrum in rectified alcohol: $\lambda_{max}$ 259 m$\mu$ ($\epsilon$=9100) and $\lambda_{infl.}$ 241 m$\mu$ ($\epsilon$=14,600).

In the thin-layer chromatogram on silicagel in the system toluene+acetone 4:1 the substance reveals an $R_f$ value of 0.11 (development with iodine).

(2) A solution of 2.03 g. (2.28 mmols) of 7-[5'-phthalimido-5' - carboxybenzhydryl-valeroyl]-amino-ceph-3-em-3-propionyloxymethyl - 4 - carboxylic acid benzhydryl ester in 20 ml. of methylenechloride is cooled to −10° C., and 1.75 ml. (21.7 mmols) of absolute pyridine are added. Then, within 12 minutes, 11.4 ml. (5.5 mmols) of a freshly prepared 10% phosphorus pentachloride solution in absolute methylenechloride are stirred in. The batch is stirred for 40 minutes at −10° C. In the course of 3 minutes, 7.62 ml. (188 mmols) of absolute methanol cooled at −20° C. are added. The reaction mixture is stirred on for 30 minutes at −10° C. and for 60 minutes at +20° C. and while being thoroughly stirred mixed with 19 ml. (19 mmols) of N-hydrochloric acid and the whole is allowed to react further for 45 minutes at 20° C. The mixture is then adjusted to pH=8.0 with 3.8 ml. of 50% aqueous tribasic potassium phosphate and 18.3 ml. of 2 N-sodium hydroxide solution. The phases are separated, the methylenechloride extract is dried over sodium sulphate and evaporated and the residue dried for 2 hours in a high vacuum. The residue is taken up in 50 ml. of toluene+ethyl acetate 3:1 and extracted with 3× 20 ml. of ethanol and 2 N-hydrochloric acid 1:1. The combined bottom phases are adjusted to pH=7.0 with 30 ml. of 2 N-sodium carbonate solution, the alcohol is expelled and the aqueous solution is once more extracted with ethyl acetate. The ethyl acetate extract is dried and evaporated and then immediately taken up in 1.14 ml. (10.5 mmols) of anisole, cooled to −30° C., and 3.32 ml. (43.5 mmols) of trifluoroacetic acid are added. The acid is allowed to act for 30 minutes at +20° C. and then thoroughly evaporated with addition of toluene. The residue is mixed with 40 ml. of methanol cooled at −30° C. and adjusted to pH=3.5 with 0.4 ml. of triethylamine. The spontaneously formed precipitate is removed on a centrifuge and washed twice with 5 ml. each of methanol, methylenechloride and ether and dried in a high vacuum. 3-propionyloxymethyl-7-amino-ceph - 3 - em - 4 - carboxylic acid of the formula

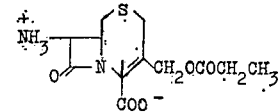

is an amorphous powder. $[\alpha]_D^{20} = +110° \pm 1°$ (c.=1.000 in 0.5 N-sodium bicarbonate solution). Ultraviolet absorption spectrum in 0.5 N-sodium bicarbonate solution: $\lambda_{max}$ 262 m$\mu$ ($\epsilon$=8200).

In the thin-layer chromatogram on silicagel in the system n-butanol+pyridine+glacial acetic acid+water (30:20:6:24) the substance reveals an $R_f$ value of 0.58 (7-aminocephalosporanic acid: $R_f$=0.55).

(3) A solution of 374 mg. of cyanoacetic acid in 2.5 ml. of tetrahydrofuran contained in a 25 ml. sulphuretting flask equipped with magnetic stirrer is mixed under nitrogen at −50 to −70° C. with 0.596 ml. of triethylamine and 0.476 ml. of trichloroacethylchloride, and the batch is allowed to react while being stirred for 15 minutes at −50 to −70° C. Then a solution, cooled at −70° C., of 573 mg. (2 mmols) of 7-amino-3-em-3-propionyloxymethyl-4-carboxylic acid and 1 ml. of triethylamine in 6.5 ml. of methylenechloride is added and the mixture is stirred for 45 minutes under nitrogen at −50 to −70° C., then stirred with 10 ml. of 10% aqueous monobasic potassium phosphate solution, whereupon the pH value adjusts itself at 5.0. The bottom organic phase is separated and the aqueous phase extracted with 5 ml. of methylenechloride and further with 10 ml. of ethyl acetate. The aqueous phase is covered with 20 ml. of ethyl acetate, acidified to pH=2.0 with 2 N-hydrochloric acid and after saturation with sodium chloride and phase separation—further extracted with 2× 10 ml. of ethyl acetate. The three ethyl acetate extracts are washed with 10 ml. of saturated sodium chloride solution, dried with sodium sulphate and filtered through a column (diameter 16 mm., height 10 cm.) of 5 g. of silicagel. The column is rinsed with 20 ml. of ethyl acetate and the combined filtrates are concentrated to 2.3 to 3.0 g. From the concentrated solution 3-propionyloxymethyl - 7 - cyanoacetylamino-ceph-3-em-4-carboxylic acid of the formula

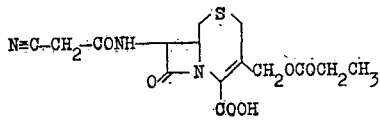

is precipitated with 50 ml. of ether+petroleum ether 1:1, and then recrystallized from tetrahydrofuran+ethyl acetate. It melts at 146–150° C.

The $R_f$ value of the substance is 0.35 (7-cyanoacetyl-aminocephalosporanic acid: $R_f$=0.26) in the thin layer chromatogram on silicagel in the system n-butanol+glacial acetic acid+water (67:10:23).

EXAMPLE 2

(1) 4.94 ml. (40 mmols) of pivaloylchloride and then slowly 2.90 ml. (26 mmols) of pyridine are added to 30 ml. of absolute dimethylformamide. While cooling with carbon dioxide snow a solution of 3.34 g. (40 mmols) of 7-[5' - phthalimido - 5' - carboxybenzhydryl-valeroyl]- amino - ceph - 3 - em - 3 - hydroxymethyl - 4 - carboxylic acid benzhydryl ester in 7 ml. of dimethylformamide is dropped in. The solution is stirred for 3 hours at room temperature, then evaporated to dryness, the residue distributed between ethyl acetate and 10% monobasic posassium phosphate solution and the aqueous phase is further extracted twice with ethyl acetate. The ethyl acetate extract is washed with saturated sodium chloride solution, dried with sodium sulphate and evaporated. The oily residue is taken up in much water and separated from the insoluble matter. 7 - [5' - phthalimido - 5' - carboxybenzhydryl-valeroyl]-amino-ceph - 3 - em - 3 - pivoloyloxymethyl - 4 - carboxylic acid benhydryl ester crystallizes from the ethereal solution in the form of fine needle clusters melting at 164–165°. $[\alpha]_D^{20}$=+10±1° (c.=1,218 in chloroform. $\lambda_{max}$ 265 m$\mu$ ($\epsilon$=8700, $\lambda_{infl.}$ 241 m$\mu$ ($\epsilon$=15,200).

In the thin-layer chromatogram on silicagel in the system toluene+acetone 9:1 the substance reveals an $R_f$ value of 0.23.

(2) A solution of 2.10 g. (2.28 mmols) of 7-[5'-phthal-imido - 5' - carboxybenzhydryl-valeroyl] - amino - ceph-3 - em - 3 - pivaloyloxymethyl - 4 - carboxylic acid benzhydryl ester in 20 ml. of methylenechloride is mixed dropwise at −10° C. with 1.75 ml. (21.7 mmols) of absolute pyridine and then within 12 minutes with 11.4 ml. (5.5 mmols) of a 10% phosphorus pentachloride solution in methylenechloride. The batch is allowed to react for 40 minutes at −10° C., then cooled to −15° C. and 7.62 ml. (188 mmols) of absolute methanol cooled at −15° C. are added. The batch is stirred for 30 minutes at −10° C. and then for 60 minutes at +20° C., 19 ml. of N-hydrochloric acid are added and stirring is continued for 45 minutes at 20° C. The reaction mixture is adjusted to pH=8.0 with 3.8 ml. of 50% tertiary potassium phosphate solution and 18.3 ml. of 2 N-sodium hydroxide solution, the methylenchloride phase is dried with sodium sulphate, evaporated and dried under a high vacuum.

The residue is taken up in 50 ml. of toluene+ethyl acetate 3:1 and extracted with 4× 20 ml. of ethanol+2 N-hydrochloric acid 1:1. The bottom phase is adjusted to pH=7.0 with 40 ml. of 2 N-sodium carbonate solution, the alcohol evaporated under vacuum and the aqueous solution extracted with ethyl acetate. The ethyl acetate solution is dried and evaporated and the residue mixed with 1.14 ml. (10.4 mmols) of anisole, cooled to −30° C., to 3.32 ml. (43.5 mmols) of trifluoroacetic acid are added; the whole is allowed to react for 30 minutes at 20° C., then the solution is evaporated with repeated additions of toluene, the residue is taken up in 40 ml. of absolute methanol cooled at −30° C. and adjusted to pH=3.5 with triethylamine. The spontaneously formed precipitate is removed on a centrifuge, washed twice each with methanol, methylenechloride and ether and dried under a high vacuum. 3 - pivaloyloxymethyl - 7 - amino - ceph - 3 - em - 4 - carboxylic acid of the formula IIIb

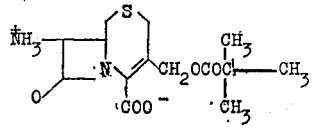

is an amorphous powder. $[\alpha]_D^{20}$=116°±1° (c.=1.034 in 0.5 N-sodium bicarbonate solution). Ultraviolet absorption spectrum in 0.5 N-sodium bicarbonate solution: $\lambda_{max}$ 262 m$\mu$ ($\epsilon$=8250).

In the thin-layer chromatogram on silicagel in the system n - butanol+pyridine+glacial acetic acid+water (30:20:6:24) the substance reveals an $R_f$ value of 0.60.

(3) In a 25 ml. sulphuretting flask equipped with magnetic stirrer a solution of 374 mg. of cyanoacetic acid in 2.5 ml. of tetrahydrofuran is mixed under nitrogen at −50 to −70° C. with 0.596 ml. of triethylamine and 0.476 ml. of trichloroacetylchloride, and the batch is stirred and allowed to react for 15 minutes at −50 to −70° C. Then a solution, cooled at −70° C. of 629 mg. (2 mmols) of 7 - amino - ceph - 3 - em - 3 - pivaloyloxy-methyl - 4 - carboxylic acid and 1 ml. of triethylamine in 6.5 ml. of methylenechloride is added and the batch is stirred for 45 minutes under nitrogen at −50 to −70° C. The batch is then stirred with 10 ml. of 10% aqueous primary potassium phosphate solution, whereby the pH=5.0 is adjusted. The phases are separated and the aqueous phase is rinsed with 5 ml. of methylenechloride and 10 ml. of ethyl acetate. The aqueous phase is covered with 20 ml. of ethyl acetate, acidified to pH=2.0 with 2 N - hydrochloric acid and, after saturation with sodium chloride and phase separation, further extracted with 2× 10 ml. of ethyl acetate. The three ethyl acetate extracts are washed with 10 ml. of saturated sodium chloride solution, dried with sodium sulphate and filtered through a column of 5 g. of silicagel. The column is rinsed with 20 ml. of ethyl acetate and the combined filtrates are concentrated to 2.3 to 3.0 g. From the concentrated solution 3-pivaloyloxymethyl - 7 - cyanoacetyl-amino-ceph-3-em-4-carboxylic acid is precipitated with 50 ml. of ether+petroleum ether 1:1.

In the thin-layer chromatogram on silicagel in the system n-butanol+glacial acetic acid+water (67:10:23) the product reveals an $R_f$ value of 0.44.

EXAMPLE 3

629 mg. (2 millimols) of 3-pivaloyloxymethyl-7-amino-ceph-3-em-4-carboxylic acid are taken up in 5 ml. of dimethylformamide and 1.43 ml. (6 mmols) of tributyl-amine and within 15 minutes at 0–5° C. 321 mg. (2 mmols) of thienylacetylchloride in 2 ml. of dimethyl-formamide are stirred in. The batch is stirred for 30 minutes at 0° C. and then for 1 hour at room temperature, then evaporated to dryness, taken up in 10% di-basic potassium phosphate and washed with ethyl acetate. The aqueous solution is adjusted to pH=2.0, the product extracted with ethyl acetate, dried with sodium sulphate and evaporated. 3-pivaloyloxymethyl-7-[thienyl-2'-acetylamino] - ceph-3-em-4-carboxylic acid crystallizes from a minimum of ethyl acetate, whereupon it melts at 144–147° C. The substance is readily soluble in methanol, ethanol, acetone and ethyl acetate and sparingly soluble in benzene, ether and water. Ultraviolet spectrum in methanol; $\lambda_{infl.}$ 260 m$\mu$ ($\epsilon$=8000) and $\lambda_{max}$ 237 m$\mu$ ($\epsilon$=14,300).

Thin-layer chromatogram on silicagel in the system n-butanol+glacial acetic acid+water (67:10:23): $R_f$= 0.61.

EXAMPLE 4

573 mg. (2 mmols) of 3-propionyloxymethyl-7-aminoceph-3-em-4-carboxylic acid are taken up in 5 ml. of degassed dimethylformamide and 1.43 ml. (6 mmols) of tributylamine and then within 15 minutes at 0 to 5° C. 321 mg. (2 mmols) of thienylacetylchloride in 2 ml. of dimethylformamide are stirred in. The batch is stirred for 30 minutes at 0° C. and then for 1 hour at room temperature, then evaporated to dryness and taken up in a 10% solution of dibasic potassium phosphate and washed with ethyl acetate. The aqueous solution is adjusted to pH=2.0, the product extracted with ethyl acetate, dried with sodium sulphate and evaporated. 3-propionyloxymethyl - 7 - [thienyl-2'-acetylamino]-ceph-3-em-4-carboxylic acid melts at 147 to 150° C. after one crystallization from ethyl acetate; it is readily soluble in methanol, ethanol and acetone, soluble in ethyl acetate and sparingly soluble in benzene, ether and water. Ultraviolet absorption spectrum in methanol: $\lambda_{infl}$. 260 m$\mu$ ($\epsilon$=8300) and $\lambda_{max}$ 237 m$\mu$ ($\epsilon$=15,100).

Thin-layer chromatogram on silicagel in the system n-butanol+glacial acetic acid+water (67:10:23): $R_f$=0.56.

In an analogous manner the following compounds can be obtained:

3-n-butyryloxymethyl-7-[thienyl-2'-acetylamino]-ceph-3-em-4-carboxylic acid, M.P. 137–140° C., crystallized from ethyl acetate;

3-chloroacetoxymethyl-7-[thienyl-2'-acetylamino]-ceph-3-em-4-carboxylic acid, M.P. 144–148° C. crystallized from a mixture of acetone and ethyl acetate;

3-formoxymethyl-7-[thienyl-2'-acetylamino]-ceph-3-em-4-carboxylic acid, M.P. 109–113° C., crystallized from ethyl acetate.

We claim:
1. A compound of Formula III

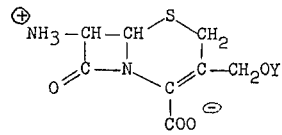

III in which Y represents an acyl radical derived from an acid selected from the group consisting of a lower alkyl sulfonic acid, a monocyclic carbocyclic aryl sulfonic acid and a carboxylic acid other than acetic acid.

2. A compound of Formula III as claimed in claim 1, in which Y represents an unsubstituted or chlorine-substituted lower alkanoyl radical, other than acetyl.

3. A compound of Formula III as claimed in claim 1, in which Y is the pivaloyl radical.

References Cited
UNITED STATES PATENTS

| | | | |
|---|---|---|---|
| 3,202,656 | 7/1965 | Abraham et al. | 260—243 C |
| 3,234,224 | 2/1966 | Schenker et al. | 260—243 C |
| 3,483,197 | 12/1969 | Bickel et al. | 260—243 C |
| 3,234,222 | 2/1966 | Fechtig et al. | 260—243 C |
| 3,278,531 | 10/1966 | Cox et al. | 260—243 C |

NICHOLAS S. RIZZO, Primary Examiner

U.S. Cl. X.R.

424—246